(12) United States Patent
Bar et al.

(10) Patent No.: US 8,100,155 B2
(45) Date of Patent: Jan. 24, 2012

(54) END PIECE FOR THE FILLING OF A TANK

(75) Inventors: Jean-Philippe Bar, Auneuil (FR);
Erwan Sagot-Dutertre, Meru (FR)

(73) Assignee: I.T.W. de France, Beauchamp (FR)

( * ) Notice: Subject to any disclaimer, the term of this patent is extended or adjusted under 35 U.S.C. 154(b) by 533 days.

(21) Appl. No.: 12/306,719

(22) PCT Filed: Jul. 16, 2007

(86) PCT No.: PCT/IB2007/002004
§ 371 (c)(1),
(2), (4) Date: Dec. 26, 2008

(87) PCT Pub. No.: WO2008/032147
PCT Pub. Date: Mar. 20, 2008

(65) Prior Publication Data
US 2009/0194198 A1    Aug. 6, 2009

(30) Foreign Application Priority Data
Sep. 13, 2006   (FR) ...................................... 06 53718

(51) Int. Cl.
*B65B 1/04* (2006.01)

(52) U.S. Cl. ........................................ 141/350; 141/349

(58) Field of Classification Search ................... 141/301, 141/348, 349, 350, 367, 368, 386
See application file for complete search history.

(56) References Cited

U.S. PATENT DOCUMENTS 7,011,121 B2 *   3/2006   Bar et al. ...................... 141/350

FOREIGN PATENT DOCUMENTS

| DE | 102006001141 A1 | 7/2006 |
| EP | 1262355 A1 | 12/2002 |
| EP | 1284212 A1 | 2/2003 |

OTHER PUBLICATIONS

ISR for PCT/IB2007/002004 dated Nov. 30, 2007.

* cited by examiner

*Primary Examiner* — Davis Hwu
(74) *Attorney, Agent, or Firm* — Lowe Hauptman Ham & Berner LLP

(57) ABSTRACT

The filling end piece comprises a duct having an insertion aperture and a sleeve moveable with respect to the duct. The sleeve is adapted to adopt a withdrawn position when not urged and an advanced position when it is urged by a movement of insertion of a spout of large diameter. The end piece comprises an obstacle for countering the filling by a small spout. The end piece comprises an end of travel abutment for a small spout, fixed with respect to the duct and projecting inwardly, the abutment being distinct from and upstream of the obstacle in the duct.

22 Claims, 10 Drawing Sheets

END PIECE FOR THE FILLING OF A TANK

RELATED APPLICATIONS

The present application is based on International Application Number PCT/IB2007/002004 filed Jul. 16, 2007, and claims priority from French Application Number 06/53718, filed Sep. 13, 2006, the disclosures of which are hereby incorporated by reference herein in their entirety.

The invention concerns the filling of tanks. It more concerns particularly an end piece for the filling of a tank such as a vehicle fuel tank.

Such end pieces are generally provided to cooperate with the spout at the end of a fuel supply nozzle.

It is known that the outer diameter of the spout of such a nozzle in practice has a value which depends on the fuel distributed. Thus, the spout of a nozzle supplying diesel or leaded petrol has a greater diameter than the spout of a nozzle supplying lead-free petrol.

To avoid any risk of error, it is useful to have a filling end piece permitting the filing of the tank exclusively by a spout supplying the correct fuel and thus preventing the filling by a spout supplying a fuel which is unsuitable. This function may be provided based on the outer diameter of the spout.

In the case of an end piece for filling a tank with diesel, it is known that there are end pieces which prevent the filling of the tank by means of a spout of a nozzle supplying lead-free petrol despite such a spout having a smaller diameter than that of the filling end piece.

From the document EP 1 284 212 such an end piece is known which comprises a sleeve moveable in a duct between a withdrawn position, enabling an obstacle to be extended in the duct, and an advanced position in which the moveable sleeve actuates the retraction of the obstacle.

The object of the invention is to improve the performance of this type of end piece.

To that end, it provides an end piece for the filling of a tank, provided for permitting the filling exclusively by a supply spout having an outer diameter greater than a predetermined threshold, said end piece comprising a duct having an aperture for spout insertion as well as a sleeve disposed in said duct downstream of said aperture, the sleeve being moveable longitudinally with respect to said duct and comprising an inner surface having a portion converging in the downstream direction, the smallest cross-sectional dimension of said portion defining said threshold, said sleeve being adapted to adopt a withdrawn position when not urged and an advanced position when it is urged by a movement of insertion, from upstream to downstream, of the spout of outer diameter greater than said threshold, said end piece further comprising, downstream of the sleeve when it is in withdrawn position, an obstacle for countering the filling by a spout of outer diameter less than said threshold, said obstacle being adapted to adopt an extended position in withdrawn position of said sleeve and a retracted position in advanced position of said sleeve, characterized in that said end piece further comprises an end of travel abutment for the insertion into said end piece of a spout of outer diameter less than said threshold, said abutment being fixed with respect to said duct and projecting inwardly of said duct, said abutment being distinct from and upstream of said obstacle in said duct.

If the user attempts to insert an inappropriate spout in the end piece according to the invention, that is to say a spout of which the outer diameter is less than the predetermined threshold, that spout enters until its distal end bears against the abutment and thus enters as deeply, if not more deeply, than an appropriate spout of which the outer diameter is greater than that threshold. The user will notice the anomaly when the actuates the filling of the tank and the nozzle is triggered as if the tank was full. This automatic triggering results from the obstacle which partially or even totally prevents the fuel from entering the tank.

The end piece according to the invention thus provides a high level of security of use since the abutment prevents the obstacle situated downstream from being forced and the user whose inappropriate spout enters as deeply as an appropriate spout cannot be mistaken as to the nature of the problem contrary to the prior device for which the obstacle itself forms an abutment. More particularly, the user of that prior device could, initially, have concluded that the end piece was defective and tried to force the obstacle.

In the end piece according to the invention, there is thus no need for the object to be capable of resisting forces such as those that a user may exert when attempting to force it.

According to preferred features, taken alone or in combination:

said abutment comprises at least one stop projection.

said projection extends within said sleeve, the latter comprising a longitudinal cut-out adapted to slide with respect to said stop projection when said sleeve is moved between its withdrawn and advanced positions;

said obstacle is a closure and said duct comprises a seat adapted to cooperate with said closure such that, when said sleeve is in its withdrawn position, said closure is disposed against said seat to close said duct and, when said sleeve is in its advanced position, said closure is spaced away from said seat to open said duct at least partially;

the end piece comprises a spring disposed between said seat and the opposite end of said sleeve from said closure, the spring biasing said sleeve in the direction of its withdrawn position;

the end piece further comprises a fluid-tight seal disposed between said seat and said closure when said sleeve is in withdrawn position;

said converging portion is frusto-conical;

the end piece comprises a collar projecting inwardly of said duct and delimiting said seat;

said collar comprises said stop projection;

the duct comprises a foot projecting from the inner surface of said duct and adapted to cooperate with said closure such that in its withdrawn position, said closure is disposed against the collar to close said duct and, when said sleeve is in its advanced position, said closure is spaced away from said collar and is disposed against said foot to open said duct at least partially;

said closure comprises a flat disc pivotally mounted about one of its diameters on the sleeve;

said sleeve comprises a rabbet allowing the pivoting of said closure;

said foot comprises a fin oriented in the longitudinal direction of the duct;

said fin has an inclined plane facing towards said closure;

said duct comprises two separate parts assembled end to end;

said two parts are cylinders assembled longitudinally adjacent said collar;

the collar comprises a shoulder enabling the positioning of the two cylinders with respect to each other;

the end piece comprises a tab fixed to said duct by its distal end and said obstacle is a closure which is connected flexibly to said tab to enable the pivoting of said closure;

said duct comprises a seat situated at its downstream end such that, when the sleeve is in its withdrawn position, said closure is disposed against said seat to close said duct and, when said sleeve is in its advanced position, said closure is held, by said sleeve, spaced away from said seat to open said duct at least partially;

the end piece comprises a collar projecting inwardly of said duct and delimiting said seat and said abutment comprises at least one stop projection belonging to said collar;

said duct is cylindrical and said closure is a flat disc;

said duct and said tab comprise means for snap-fitting of said tab onto said duct;

The features and advantages of the invention will appear from the following description, given by way of preferred but non-limiting example, with reference to the accompanying drawings in which:

FIG. 1 represents an end piece according to the invention, which in the example described below is an end piece for the filling of a motor vehicle tank.

Figure 1:
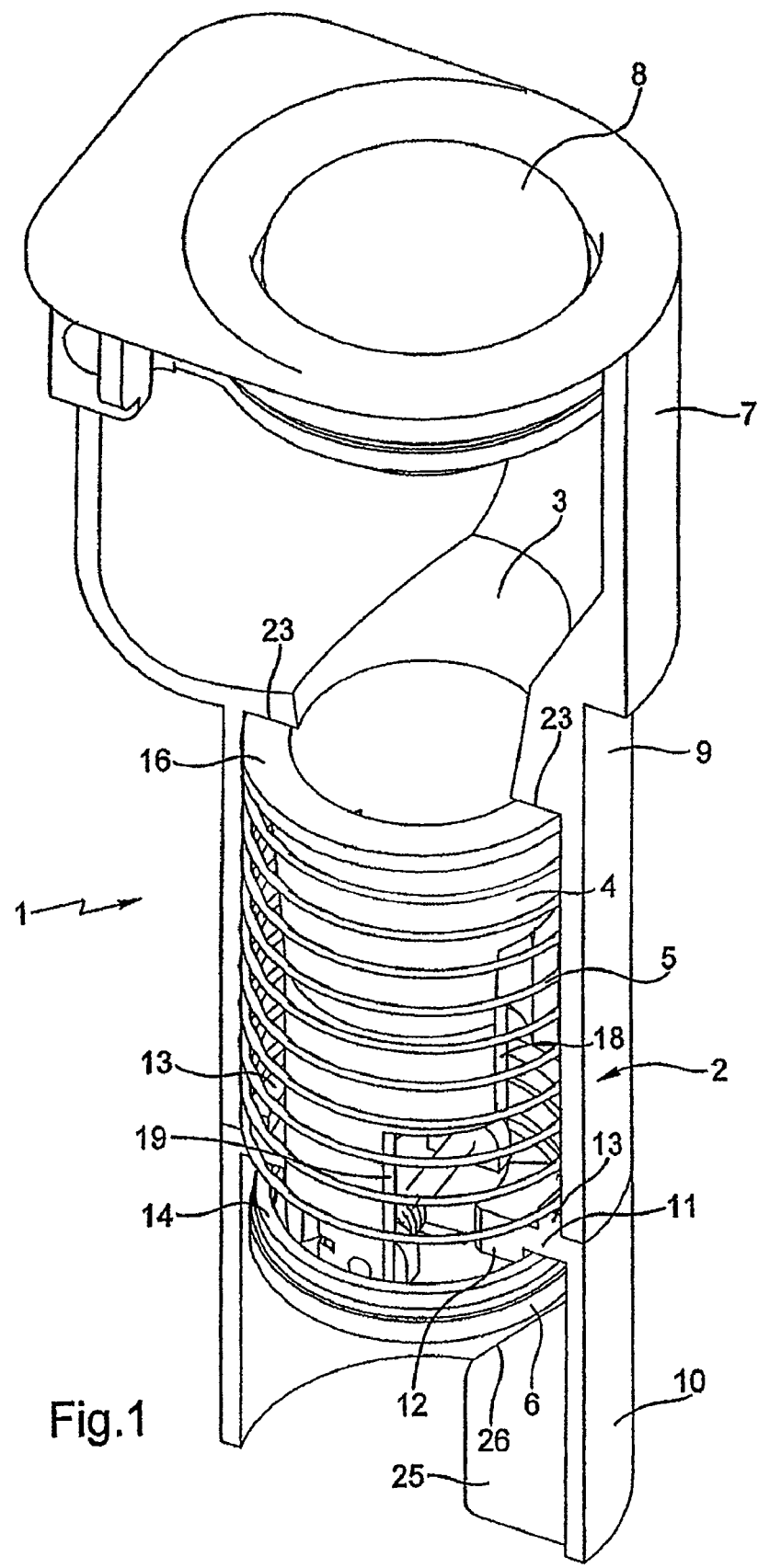
FIG. 1 is a perspective view of an end piece according to the invention of which the duct is viewed in cross-section in order to reveal the constituents of the end piece.

The filling end piece 1 comprises a duct 2 which has an aperture 3 for the insertion of a supply spout. The duct 2 is generally adapted to be connected to a pipe leading to the tank to fill and the end piece 1 is positioned such that the aperture 3 is accessible from outside the vehicle.

Within the duct 2 there is disposed a sleeve 4 with a frusto-conical portion biased towards its withdrawn position (that represented in FIG. 1) by a spring 5.

A closure 6 is pivotally mounted on one of the ends of the sleeve 4. The pipe 2 in the present example is extended beyond the spout insertion aperture 3 by a skirt 7 bearing an upper obturator 8 which is optional here.

Figure 2:
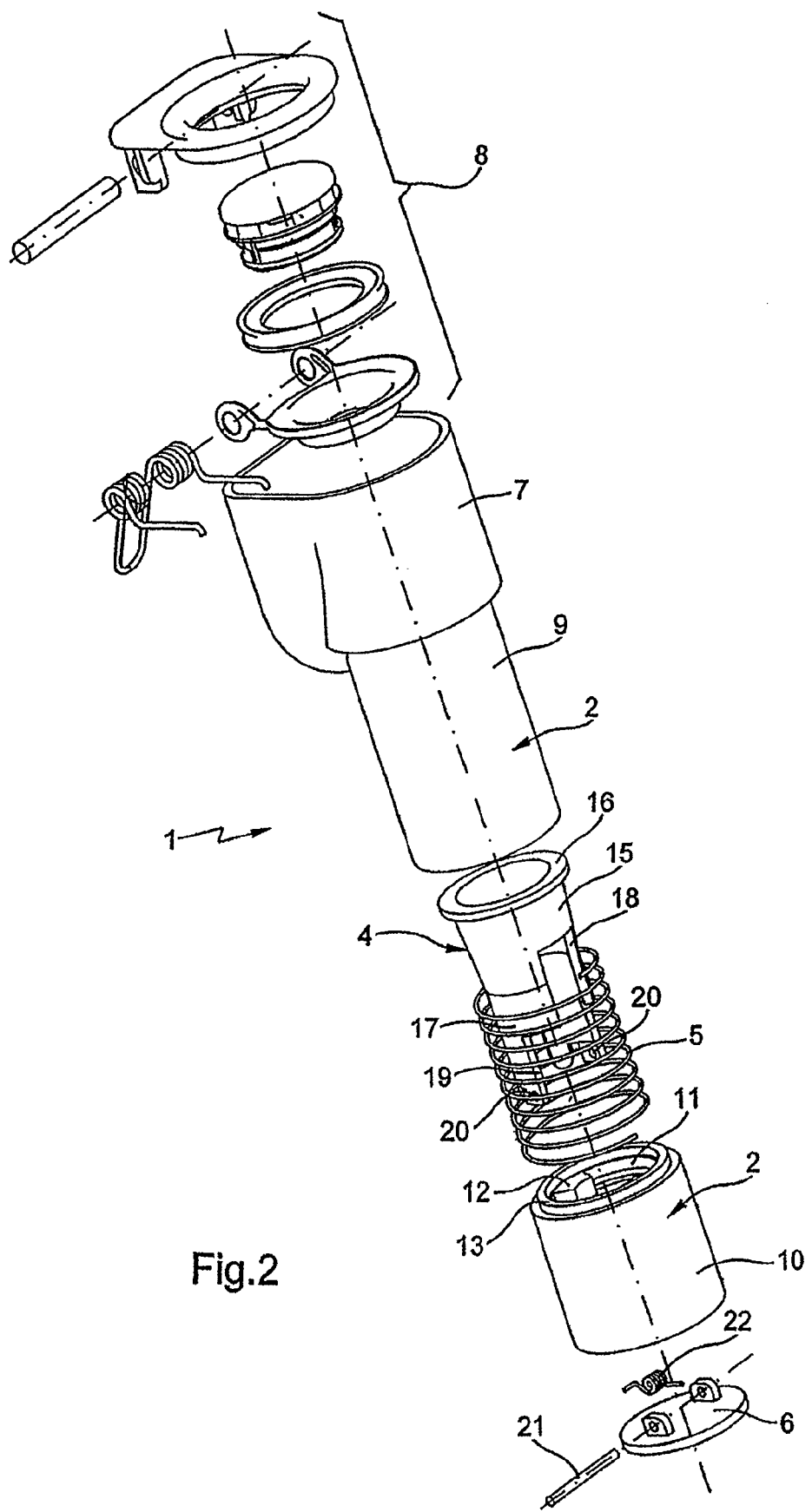
FIG. 2 is an exploded view of the end piece of FIG. 1.

With reference to FIG. 2, each member of the end piece is described below.

The upper obturator 8 is a conventional obturator provided with a seal and a return spring and will not be described in further detail here.

The duct 2 is, in the present example, formed by assembling a first cylinder 9 and a second cylinder 10, the skirt 7 being attached to the first cylinder 9.

Figure 3:
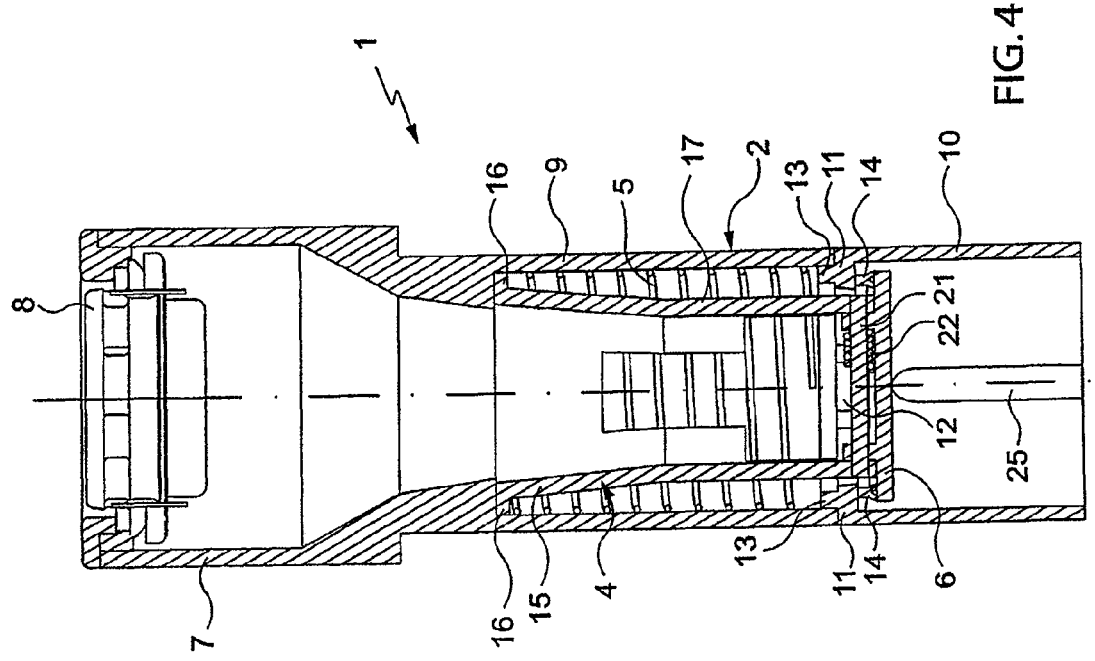
FIGS. 3 and 4 are views in longitudinal cross-section, respectively from the side and from the front, of the end piece of FIG. 1.
Figure 4:
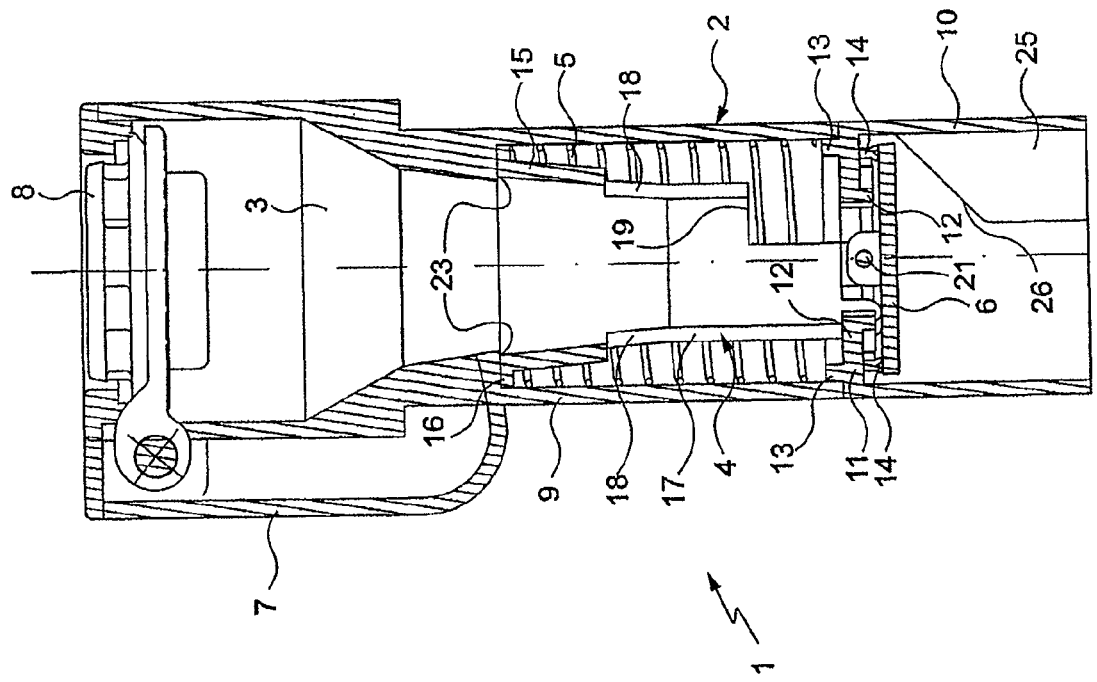

Starting from the aperture 3, the first cylinder 9 has a cylindrical inner surface (see FIGS. 1, 3 and 4).

The second cylinder 10 also has an inner cylindrical surface with in addition a collar 11 projecting around the whole of the perimeter of a section of that inner cylindrical surface. The collar 11 projects inwardly of the second cylinder 10 and forms a seat for the closure 6.

The collar 11 bears two diametrically opposite stop projections 12 which project from the collar 11 inwardly from the second cylinder 10.

The collar 11 further bears a shoulder 13 enabling correct assembly of the first cylinder 9 and the second cylinder 10 to form the duct 2.

As a variant, the duct 2 may be formed as one piece and recourse to the shoulder 13 is then no longer necessary.

The collar 11 is also provided with a seal 14 around the whole of its perimeter, the seal 14 extending in the opposite direction to the first cylinder 9 (see FIGS. 3 and 4).

The second cylinder 10 further comprises a foot projecting from its inner surface, the projecting foot being formed in the present example by a fin 25 having an inclined plane 26.

The sleeve 4 is formed from a frusto-conical portion 15 provided with a circular brim 16 at one of its ends, and attached by the other of its ends to a cylindrical portion 17.

Two longitudinal cut-outs 18 are formed in the sleeve 4 and extend over the entire height of the cylindrical portion 17 and over part of the height of the frusto-conical portion 15. The width of those cut-outs 18 is greater than the width of the stop projections 12, such that the frusto-conical sleeve 15 can be pushed inwardly in the direction of the second cylinder 10 while the stop projections 12 are each engaged in a cut-out 18 to permit that movement.

Furthermore, a rabbet 19 is formed in the cylindrical portion 17 thus removing practically half of the cylindrical portion 17 over approximately half the height of that portion 17.

At its opposite end to the circular brim 16, the sleeve 4 comprises two diametrically opposite holes 20 enabling the closure 6 to have a turning connection to that end via a shaft 21.

Figures 5, 6:
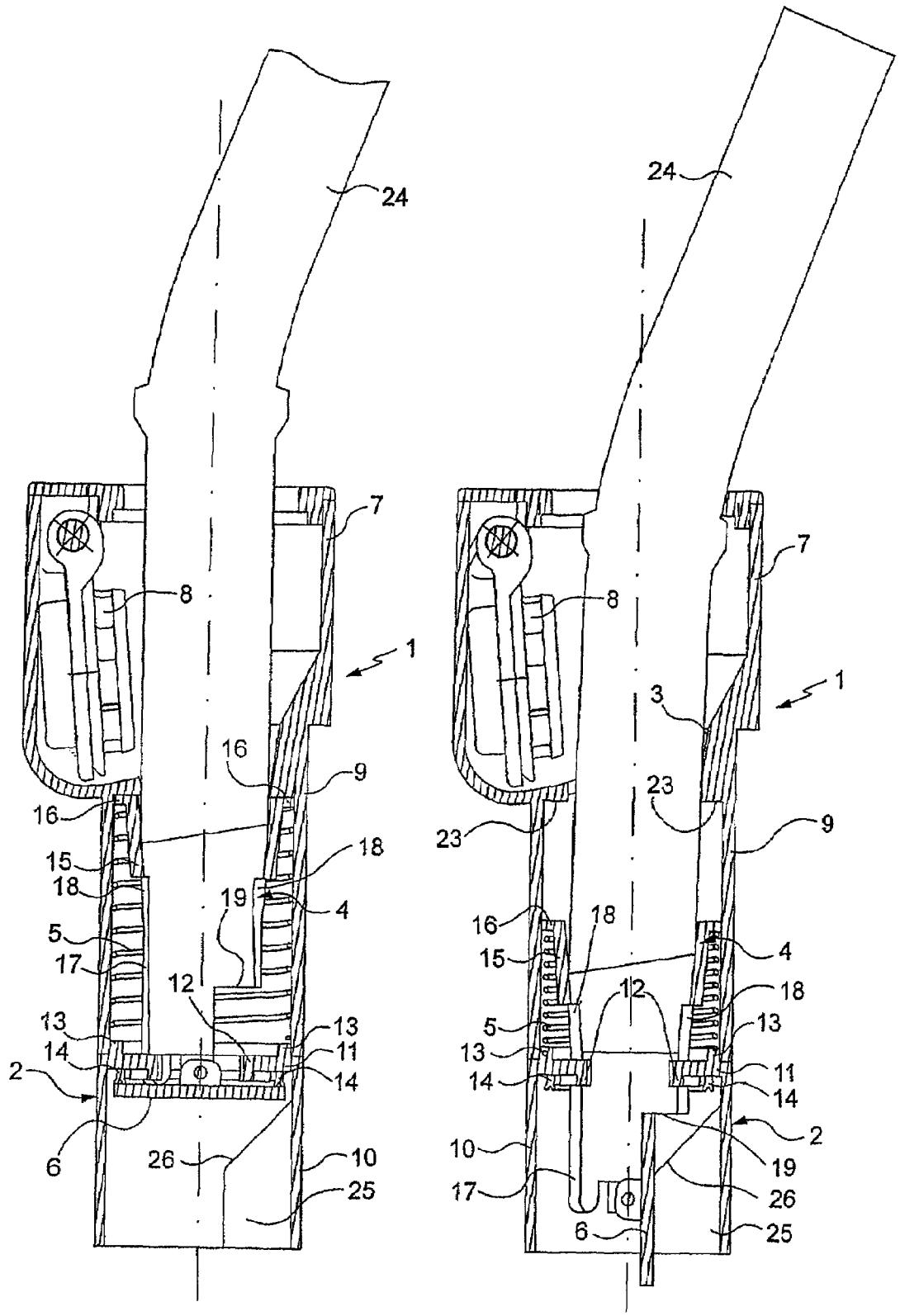
FIG. 5 is a similar view to FIG. 3 showing the insertion of a spout of appropriate diameter into the end piece, the sleeve being in its withdrawn position.
FIG. 6 is a similar view to FIG. 5, the sleeve being in its advanced position further to a pushing-in movement of the spout.

The closure 6 is thus pivotally mounted on the end of the sleeve 4 between a closed (or extended) position in which the closure 6 is transversely oriented to the longitudinal axis of the sleeve 4 (see FIG. 5) and an open (or retracted) position in which half of the closure 6 locates in the rabbet 19, the closure 6 then being oriented parallel to the longitudinal axis of the sleeve 4 (see FIG. 6).

A return spring 22 holds the closure 6 in closed position when not urged.

The mounting of the closure 6 on the sleeve 4 and of the sleeve 4 in the duct 2 is carried out in such a manner that, when the closure 6 is in closed position, the collar 11 is disposed between the end of the cylindrical portion 17 and the closure 6.

Moreover, the spring 5 is disposed between the circular brim 16 and the shoulder 13 (or directly the collar 11 in the absence of that shoulder 13) such that, in the absence of urging, the sleeve 4 is held in a withdrawn position, and, consequently, the closure 6 is held against the seal 14 thus closing the duct 2 in fluid-tight manner.

Adjacent the insertion aperture 3 the duct 2 comprises a shoulder 23 forming an abutment which defines the withdrawn position of the sleeve 4.

Thus, the length between the circular brim 16 and the closure 6 in closed position must be chosen conjointly with the thickness of the seal 14 such that, in accordance with FIGS. 3 and 4, when the sleeve 4 is in withdrawn position, the closure 6 lightly pinches the seal 14.

The operation of the end piece 1 which has just been described is set forth below with reference to FIGS. 5 to 7.

In FIGS. 5 and 6, the end piece 1 cooperates with the spout 24 of a nozzle supplying fuel such as those encountered at service stations. This spout 24 is the spout adapted for that end piece 1, that is to say which has a sufficient (appropriate) outer diameter to enable the filling of the tank (not shown).

For example, the spout 24 is a spout supplying diesel and the end piece 1 is an end piece mounted on a vehicle with a diesel engine. The frusto-conical portion 15 of the sleeve 4 is thus provided for the spout 24, that is to say that the smallest diameter of that frusto-conical portion 15 is less than the outer diameter of the spout 24.

With reference to FIG. 5, the spout 24 is inserted into the aperture 3. The upper obturator 8 of the present example retracts due to the pushing-in movement of the spout 24 which then reaches the frusto-conical portion 15 of the sleeve 4.

As the pushing-in movement of the spout 24 continues, the end of the spout 24 acts on the sleeve 4 to push it inwardly to its advanced position by compressing the spring 5. During this pushing-in movement, the closure 6 is moved away from the seal 14 and comes into abutment against the inclined plane 26 of the fin 25, which causes the pivoting of the closure 6 about its shaft 21.

The pushing-in movement of the spout 24 continues until the sleeve 4 has reached its advanced position in which the fin 25 holds the closure 6 parallel to the longitudinal axis of the sleeve 4 and of the duct 2 (see FIG. 6).

In this position, the duct 2 is open and the filling of the tank can take place.

Once the tank has been filled, the spout 24 is withdrawn from the end piece, the sleeve 4 then returning to the withdrawn position in accordance with FIGS. 3 and 4.

Figure 7:
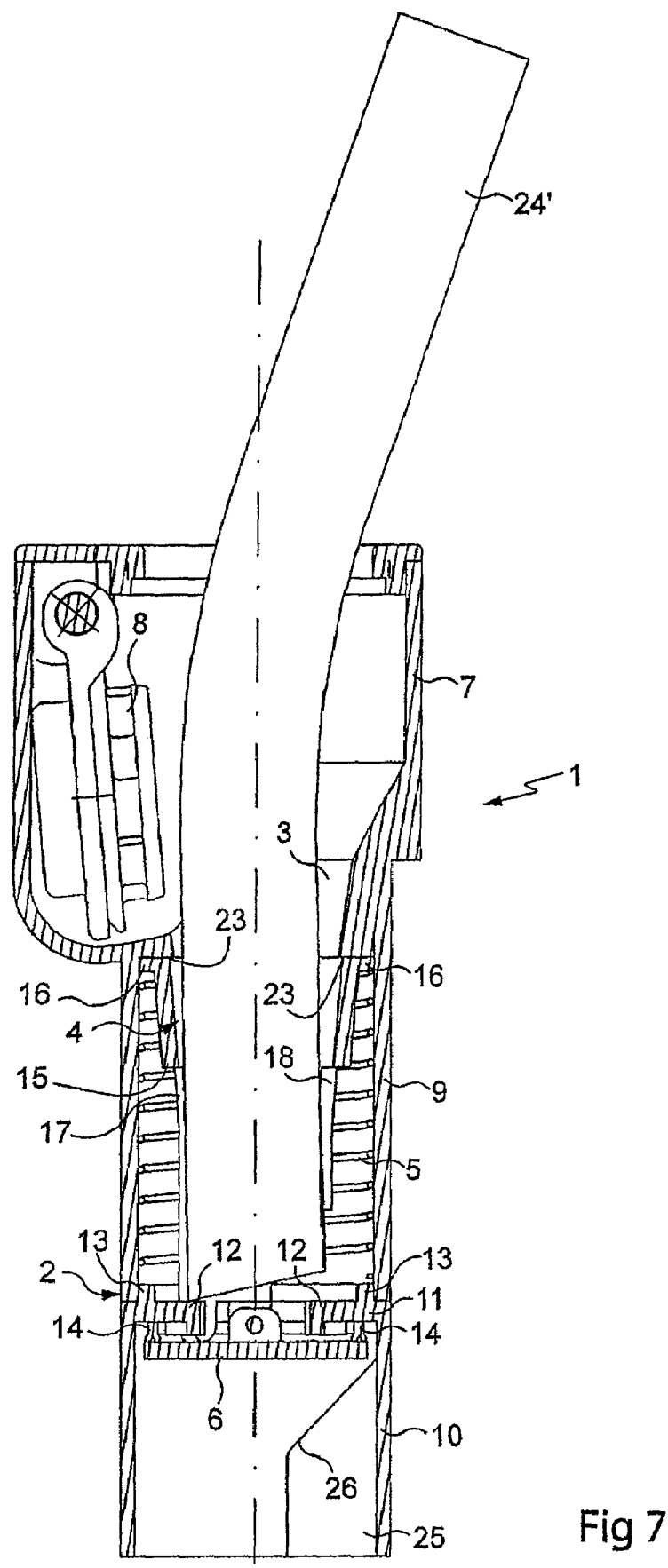
FIG. 7 is a similar view to FIG. 6, apart from the fact that the spout represented in this case has too small an outer diameter to induce opening of the duct.
Figure 8:
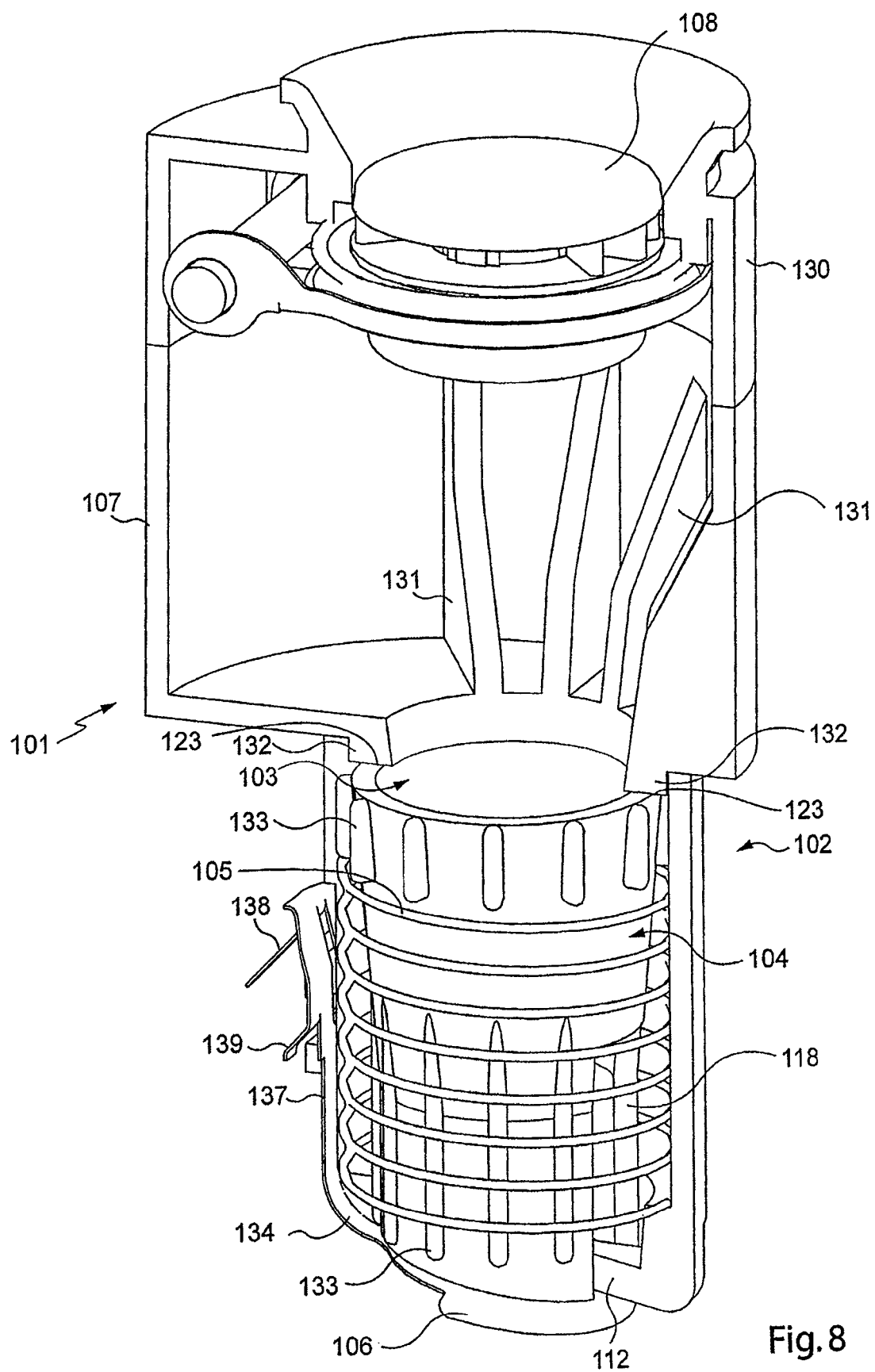
FIG. 8 is a perspective view of a end piece according to another embodiment in which the closure is disposed at the downstream end of the duct.
Figure 9:
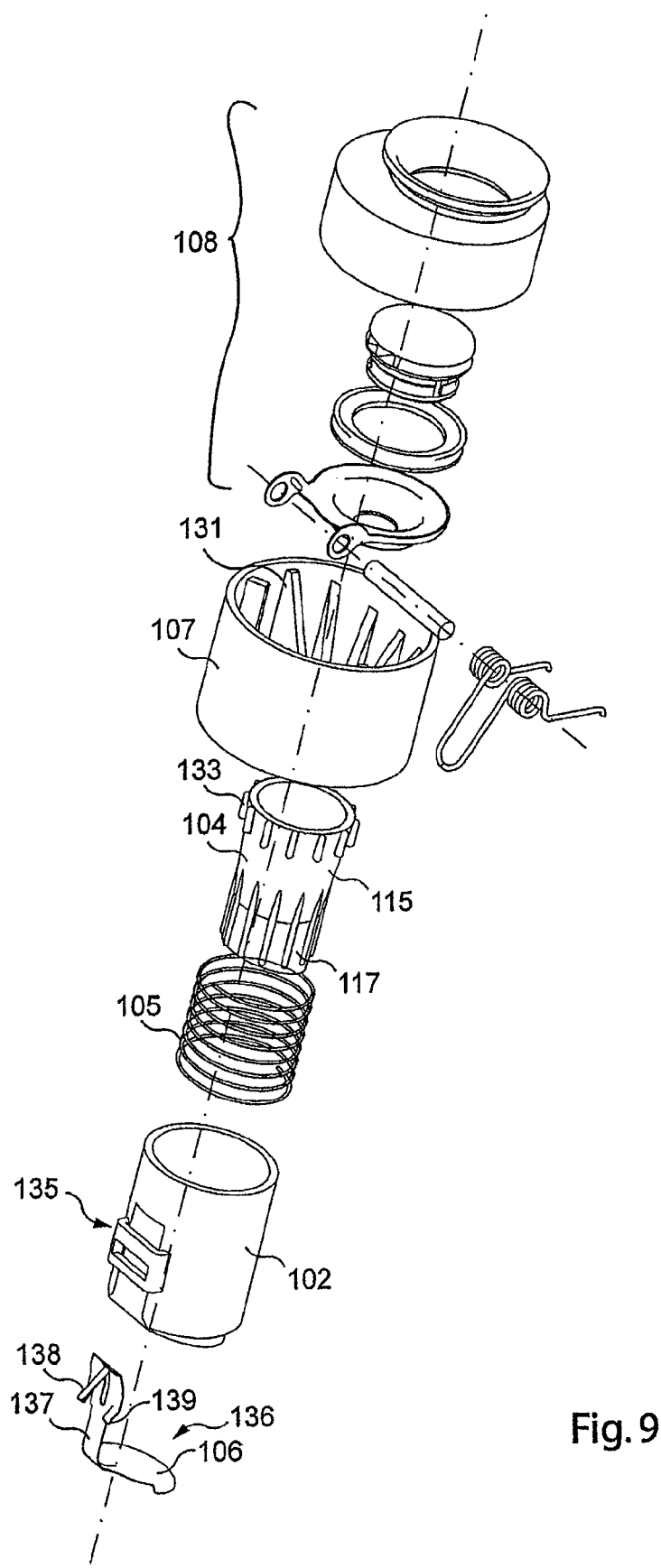
FIG. 9 is an exploded view of the end piece of FIG. 8.
Figures 10, 11:
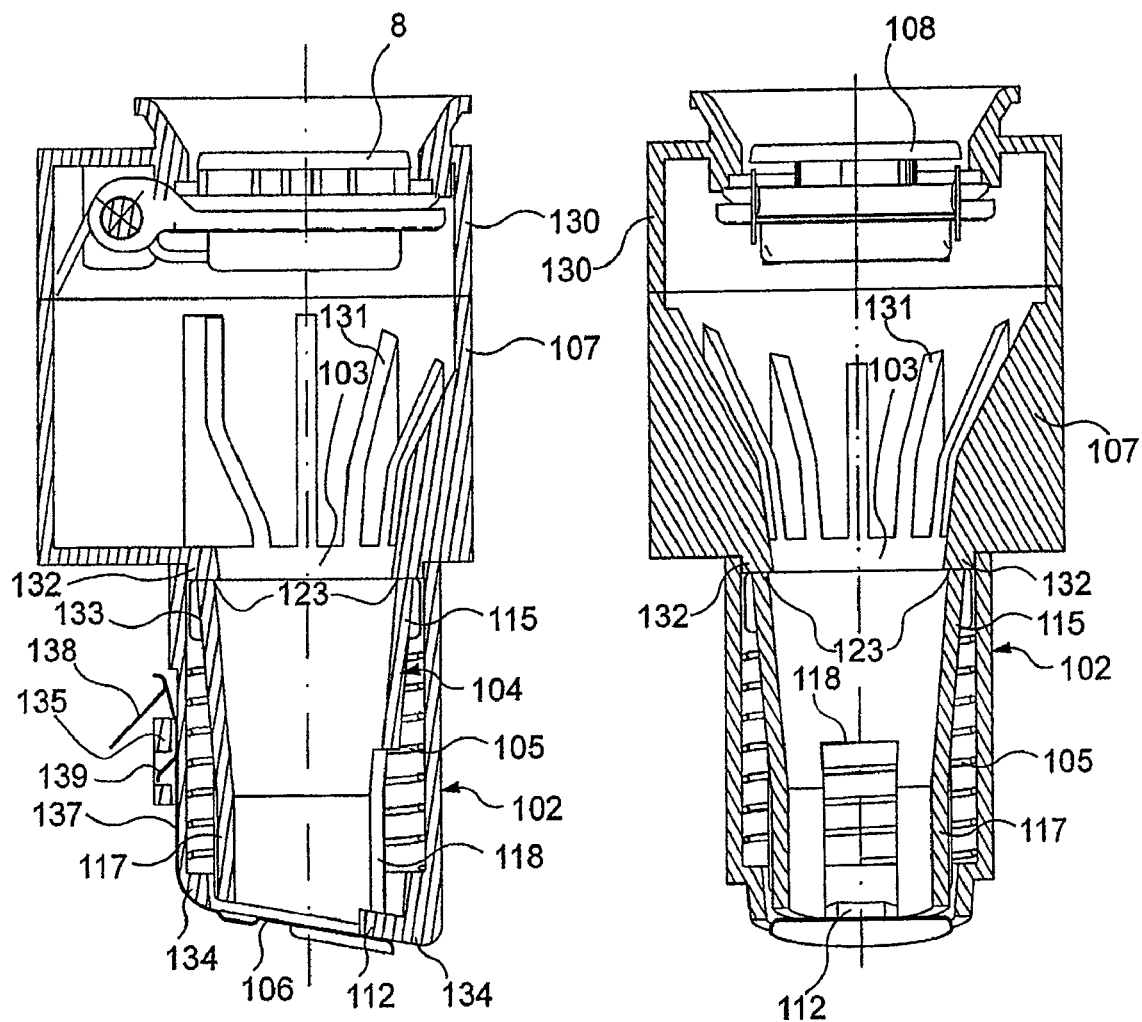
FIGS. 10 and 11 are views in longitudinal cross-section, respectively from the side and from the front, of the end piece of FIG. 8.

With reference to FIG. 7, if a spout 24' is used of a diameter less than that for which the sleeve 1 is intended, for example a spout 24' of a nozzle supplying lead-free petrol, the smallest diameter of the frusto-conical portion 15 of the sleeve 4 is then greater than the outer diameter of that spout 24'.

A movement of pushing in that spout 24' into the end piece 1 leads to the situation in FIG. 7 in which the spout 24' passes through the frusto-conical portion 15, engages within the cylindrical portion 17 until it comes into abutment against one or other of the stop projections 12, without causing the sleeve 4 to move.

The spout 24' is thus prevented from moving, as it cannot go further into the end piece 1, while the latter remains closed, the sleeve 4 not having left its withdrawn position.

With reference to FIGS. 8 to 14, an end piece according to another embodiment will now be described. For similar parts the same numerical references have been kept as earlier, but increased by 100.

The upper obturator 108 is a conventional obturator provided with a seal and a return spring which has a cylindrical side wall 130 extending towards the aperture 103.

The skirt 107 is fixed by one side to the cylindrical side wall 130 and by the other syndrome to that of the duct 102.

The skirt 107 comprises a series of ribs 131 which extend transversely of the inner surface of the skirt 107. Adjacent the obturator 108, the edge of several ribs 131 is beveled towards the obturator 108 so as to form an insertion cone for the spout 124. Adjacent the duct 102, the edge of those ribs 131 extends longitudinally so as to define a semi-cylindrical space of which the diameter is slightly greater than the diameter of the spout 124.

One of the ribs 131 has an edge of which the beveled portion is situated adjacent the aperture 103 and the longitudinally extending portion is situated adjacent the obturator 108.

At the opposite end from the obturator 108, the skirt 107 has a base having a circular opening forming the aperture 103. On the perimeter of the aperture 103, on the opposite side from the ribs 131, the skirt 107 comprises a circular rib 132. This rib 132 defines a shoulder 123 forming an abutment which defines the withdrawn position of the sleeve 104.

The sleeve 104 has a portion 115 of which the inner surface is frusto-conical. It continues with a portion 117 of which the inner surface is cylindrical with the inner diameter of this portion corresponding to the smallest inner diameter of the portion 115.

A longitudinal cut-out 118 is formed in the sleeve 104 and extends over the entire height of portion 117 and over part of the height of portion 115.

Portion 115 is provided on its outer surface with a series of longitudinal ribs 133 which enable the sleeve 104 to be held centered on the main axis of the end piece 101. The outer surface of portion 117 is also provided with a series of ribs 133.

The duct 102 is of one piece and of cylindrical general form both with regard to its inner surface and with regard to its outer surface. The duct 102 is fitted over the rib 132 of the skirt 107.

The downstream end of the duct 102 has an inwardly projecting collar 134. This collar 134 is oriented slightly obliquely with respect to the transverse direction. On its portion situated the furthest downstream, the collar 134 bears a stop projection 112 projecting inwardly of the duct 102 from the collar 134.

The width of the cut-out 118 is greater than the width of the projection 112 so as to enable the sleeve 104 to be pushed in while the projection 112 engages in the cut-out 118 to allow that movement.

The duct 102 also comprises a bridge 135 on its outer surface. The two legs of the bridge 135 emerge from the outer surface whereas the spanning portion of the bridge 135 has a cut-out extending from one leg to the other and serving for the latching of a device 136 described below.

This device 136 is of one piece of cut-out metal comprising a closure 106 of circular general form with no aperture, as well as a tab 137 connected to the closure 106 by one of its two ends. The closure 106 can pivot with respect to the tab 136.

At the other end of the tab 137, the free end, the tab 137 has a latching portion, which is wider than the rest of the tab 137 itself formed by a rectangular portion. This latching portion has a U-shaped cut-out portion delimiting a main U-shaped latching foot in the center of that portion. On respective opposite sides of that leg 138 a cut-out portion is provided extending onwards from the edges of the rectangular portion such that the latching portion also comprises two secondary legs 139. The legs 139 are shorter and emerge from the latching portion spaced away from the free end. The legs 138, 139 are able to pivot slightly with respect to the rest of the latching portion.

In the absence of urging, the angle between the closure 106 and the tab 137 is equivalent to that between the main plane of the collar 134 and the axial direction of the duct 102.

Thus, in the absence of urging, the closure 106 comes into position against the collar 134 and more specifically against its seat forming surface.

No seal is provided between the collar 134 and the closure 106. A small quantity of fuel coming from an inappropriate spout may enter the tank but the obstacle formed by the closure 106 suffices to trigger the nozzle, which makes it possible not to exceed the threshold of the tolerated quantity of inappropriate fuel in the tank. According to a variant, a seal is provided for fluid-tight closing with respect to the closure.

The latching portion cooperates with the bridge 135 for latching of the tab 137 with the duct 102. To latch the tab 137, the latching portion is passed under the spanning portion of the bridge 135, the legs 138, 139 then being pressed into the main plane of the tab 137. The tab 137 is moved until the legs 139 insert into the cut-out provided and the main leg 138 projects beyond the bridge 135 to be able to come into position above the spanning portion and thus lock the tab 137 on the duct 102.

The operation of the end piece 101 which has just been described is set forth below with reference to FIGS. 12 to 14.

Figures 12, 13:
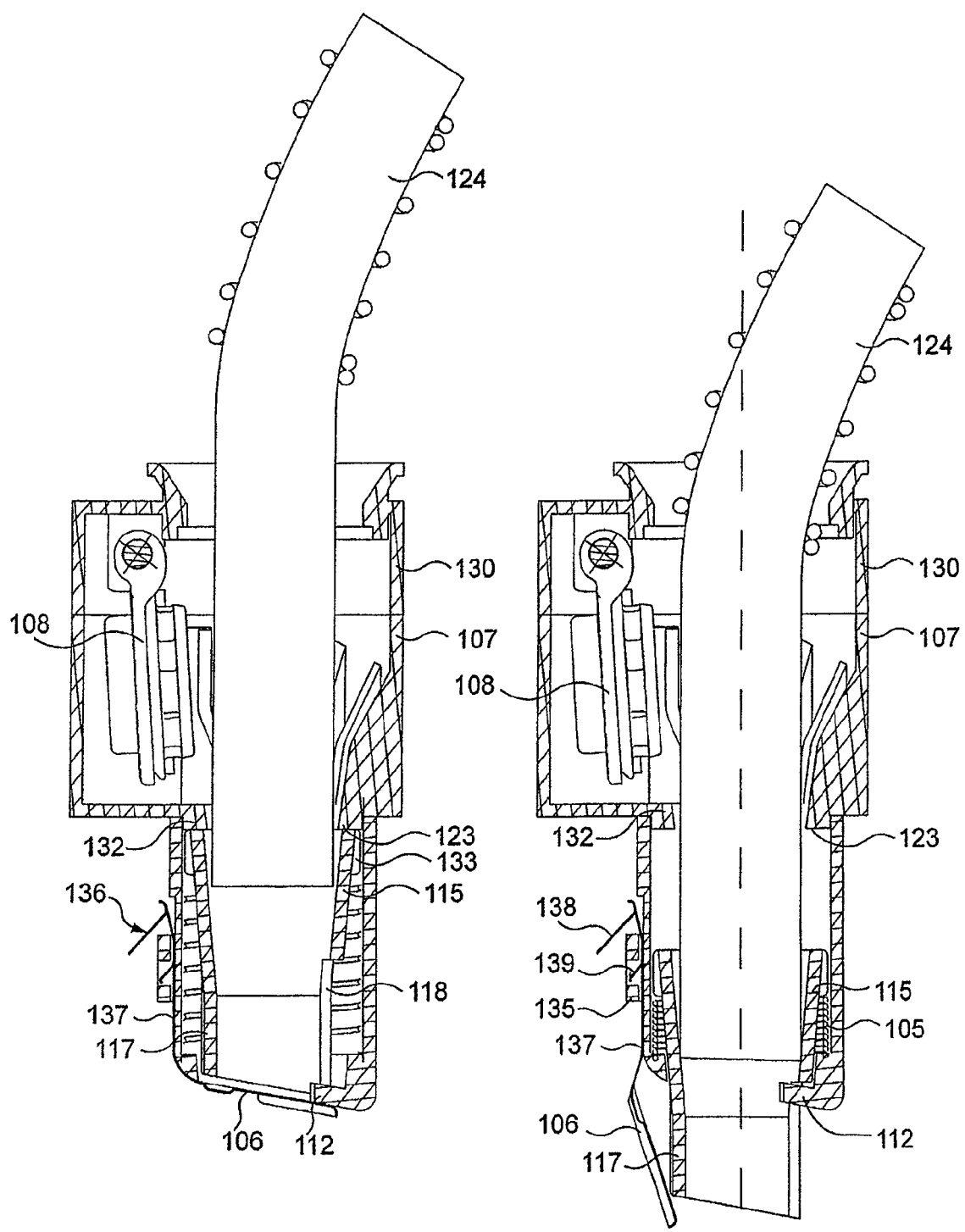
FIG. 12 is a similar view to that of FIG. 10 showing the insertion of a spout of appropriate diameter into the end piece, the sleeve being in its withdrawn position.
FIG. 13 is a similar view to that of FIG. 10, the sleeve being in its advanced position further to a pushing-in movement of the spout.

In FIG. 12, the spout 124 is inserted into the aperture 103. The obturator 108 retracts due to the pushing-in movement of the spout 124 which then reaches the frusto-conical portion 115 of the sleeve 104.

The pushing-in movement of the spout 124 continues until the sleeve 104 has reached its advanced position in which the sleeve 104 keeps the closure 106 pivoted and oriented practically in line with the tab 137 (see FIG. 13).

In this position, the duct 102 is open and the filling of the tank can take place. Once the tank has been filled, the spout 124 is withdrawn from the end piece, the sleeve 104 then returning to its withdrawn position.

Figure 14:
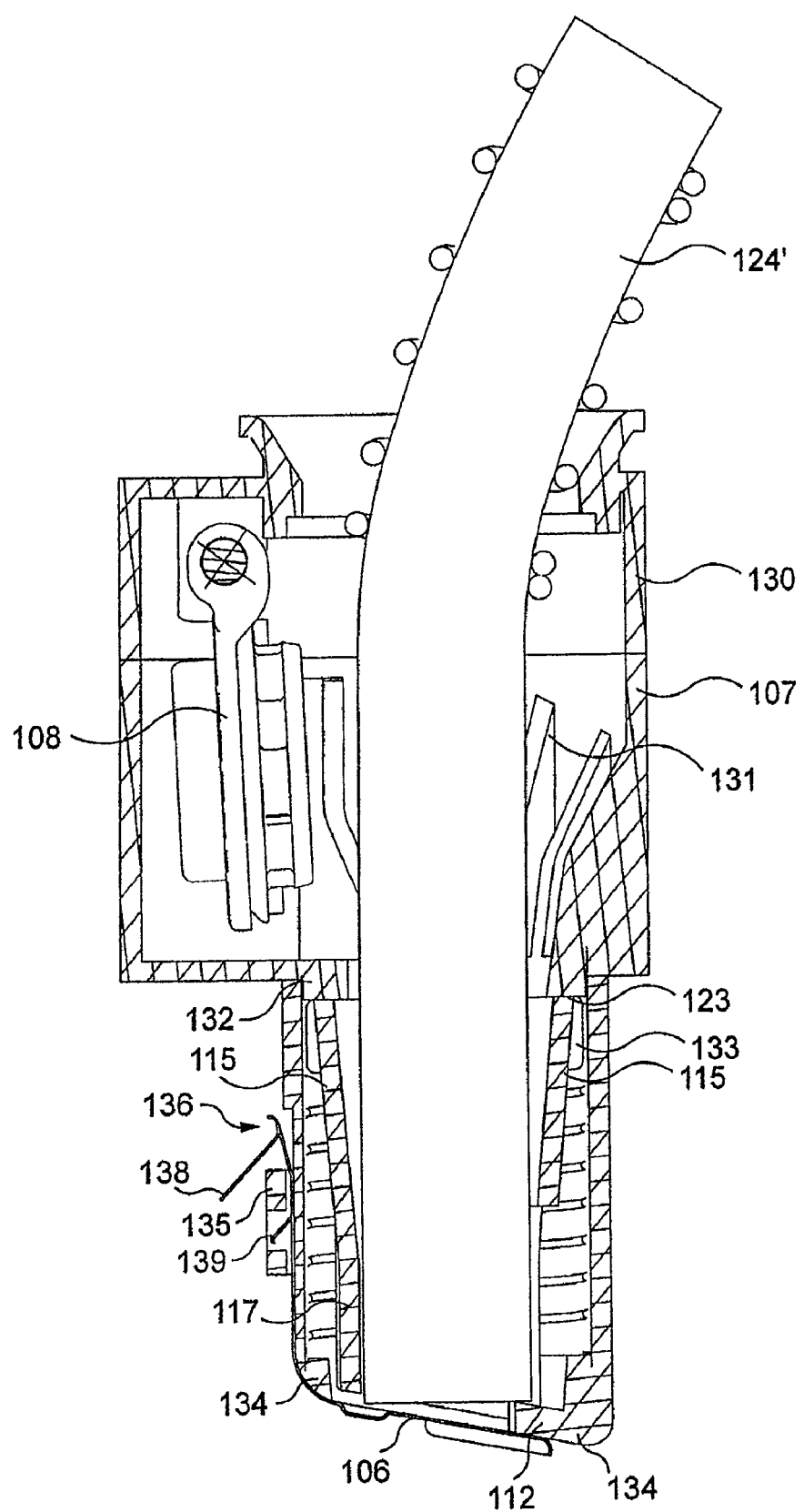
FIG. 14 is a similar view to FIG. 13, apart from the fact that the spout represented in this case has too small an outer diameter to induce opening of the duct.

With reference to FIG. 14, if a spout 124' is used of a diameter less than that for which the sleeve 101 is intended, for example a spout 124' of a nozzle supplying lead-free petrol, the smallest diameter of the frusto-conical portion 115 of the sleeve 104 is then greater than the outer diameter of that spout 124'.

A movement of pushing in that spout 124' into the end piece 101 leads to the situation in FIG. 14 in which the spout 124' passes through the frusto-conical portion 115, engages within the cylindrical portion 117 until it comes into abutment against the stop projection 112, without causing the sleeve 104 to move.

The spout 124' is thus prevented from moving, as it cannot go further into the end piece 101, whereas the latter remains closed, the sleeve 104 not having left its withdrawn position.

In variants not shown, the frusto-conical portion of the sleeve is adapted in shape and dimensions to other types of spout. According to one variant, that portion converges from downstream with an oval section According to another variant, that portion is constituted by a stack of cylinders of which the diameter reduces in the direction of the cylindrical portion.

According to still another variant, the closure moreover has a different shape to that of the present examples, and is differently hinged to the sleeve or to the tab, it suffices for the closure to provide suitable closing when it is disposed against the seat delimited by the collar and furthermore for it to be held open when the sleeve is in advanced position.

What is claimed is:

1. An end piece for the filling of a tank, provided for permitting the filling exclusively by a supply spout having an outer diameter greater than a predetermined threshold, said end piece comprising a duct having an aperture for spout insertion as well as a sleeve disposed in said duct downstream of said aperture, the sleeve being moveable longitudinally with respect to said duct and comprising an inner surface having a portion converging in the downstream direction, the smallest cross-sectional dimension of said portion defining said threshold, said sleeve being adapted to adopt a withdrawn position when not urged and an advanced position when it is urged by a movement of insertion, from upstream to downstream, of said of outer diameter greater than said threshold, said end piece further comprising, downstream of said sleeve when it is in withdrawn position, an obstacle for countering the filling by a spout of outer diameter less than said threshold, said obstacle being adapted to adopt an extended position in withdrawn position of said sleeve and a retracted position in advanced position of said sleeve, wherein said end piece further comprises an end of travel abutment for the insertion into said end piece of a spout of outer diameter less than said threshold, said abutment being fixed with respect to said duct and projecting inwardly of said duct said abutment being distinct from and upstream of said obstacle in said duct.

2. An end piece according to claim 1, wherein said abutment comprises at least one stop projection.

3. An end piece according to claim 2, wherein said projection extends within said sleeve, the latter comprising, a longitudinal cut-out adapted to slide with respect to said stop projection when said sleeve is moved between its withdrawn and advanced positions.

4. An end piece according to claim 1, wherein said obstacle is a closure and in that said duct comprises a seat adapted to cooperate with said closure such that, when said sleeve is in its withdrawn position, said closure is disposed against said seat to close said duct and, when said sleeve is in its advanced position, said closure is spaced away from said seat to open said duct at least partially.

5. An end piece according to claim 4, further comprising a spring disposed between said seat and the opposite end of said sleeve from said closure, the spring biasing said sleeve in the direction of its withdrawn position.

6. An end piece according to claim 4, it further comprising a fluid-tight seal disposed between said seat and said closure when said sleeve is in withdrawn position.

7. An end piece according to claim 4, further comprising a collar projecting inwardly of said duct and delimiting said seat.

8. An end piece according to claim 7, wherein said collar comprises said stop projection.

9. An end piece according to claim 7, wherein said duct comprises a foot projecting from the inner surface of said duct and adapted to cooperate with said closure such that in its withdrawn position, said closure is disposed against the collar to close said duct and, when said sleeve is in its advanced position, said closure is spaced away from said collar and is disposed against said foot to open said duct at least partially.

10. An end piece according to claim 9, wherein said closure comprises a flat disc pivotally mounted about one of its diameters on the sleeve.

11. An end piece according to claim 10, wherein said sleeve comprises a rabbet allowing the pivoting of said closure.

12. An end piece according to claim 9, wherein said foot comprises a fin oriented in the longitudinal direction of the duct.

13. An end piece according to claim 12, wherein said fin has an inclined plane facing towards said closure.

14. An end piece according to claim 9, wherein said duct comprises two separate parts assembled end to end.

15. An end piece according to claim 9, wherein said two parts are cylinders assembled longitudinally adjacent said collar.

16. An end piece according to claim 15, wherein the collar comprises a shoulder enabling the positioning of the two cylinders with respect to each other.

17. An end piece according to claim 1, wherein said converging portion is frusto-conical.

18. An end piece according to claim 1, further compising a tab fixed to said duct by its distal end and in that said obstacle is a closure which is connected flexibly to said tab to enable the pivoting of said closure.

19. An end piece according to claim 18, wherein said duct comprises a seat situated at its downstream end such that, when said sleeve is in its withdrawn position, said closure is disposed against said seat, to close said duct and, when said sleeve is in its advanced position, said closure is held, by said sleeve, spaced away from said seat to open said duct at least partially.

20. An end piece according to claim 19, further comprising a collar projecting inwardly of said duct and delimiting said seat and in that said abutment comprises at least one stop projection belonging to said collar.

21. An end piece according to claims 18, wherein said duct is cylindrical and said closure is a flat disc.

22. An end piece according claim 18, wherein said duct and said tab comprise means for snap-fitting of said tab onto said duct.

* * * * *